United States Patent [19]
Tanaka et al.

[11] 4,355,866
[45] Oct. 26, 1982

[54] STRIPE-COLOR FILTER

[75] Inventors: Eiichiro Tanaka, Kishiwada; Kousaku Yano, Higashiosaka; Yoshitaka Aoki, Kadoma; Shinji Fujiwara, Minoo, all of Japan

[73] Assignee: Matsushita Electric Industrial Co., Ltd., Kadoma, Japan

[21] Appl. No.: 179,875

[22] Filed: Aug. 20, 1980

[30] Foreign Application Priority Data

Aug. 21, 1979 [JP] Japan ................... 54-106947
Jun. 5, 1980 [JP] Japan ................... 55-76490

[51] Int. Cl.³ .......................... G02B 5/22; G02B 5/28
[52] U.S. Cl. ........................... 350/164; 350/316
[58] Field of Search ............... 350/164, 166, 163, 316

[56] References Cited

U.S. PATENT DOCUMENTS 3,356,522  12/1967  Libbert .................. 350/164
4,029,394  6/1977   Araki .................... 350/166

FOREIGN PATENT DOCUMENTS 52-82253   7/1977  Japan ..................... 350/164
53-115120  9/1977  Japan .
53-11525   2/1978  Japan .
53-11526   2/1978  Japan .

Primary Examiner—Jon W. Henry
Attorney, Agent, or Firm—Wenderoth, Lind & Ponack

[57] ABSTRACT

A stripe-color filter for spatial color encoding in a color TV camera, having a striped semiconductor filter-element-layer supported between a transparent substrate layer and a transparent dielectric covering layer. There are further provided a first coating layer of a transparent thin film between the substrate layer and the semiconductor filter-element-layer and a second coating layer of a transparent thin film between the semiconductor filter-element-layer and the covering layer. The refractive indexes of those layers are in the relationship: $n_F > n_{T1} > n_S$ and $n_F > n_{T2} > n_D$, wherein $n_S$ represents the refractive index of the substrate layer, $n_{T1}$ the first coating layer, $n_F$ the semiconductor filter-element-layer, $n_D$ the covering layer, and $n_{T2}$ the second coating layer. Thus, the first and second coating layers act as anti-reflection layers, so that the spectral transmissivity at the semiconductor layer region of the stripe-color filter is improved.

6 Claims, 8 Drawing Figures

STRIPE-COLOR FILTER

BACKGROUND OF THE INVENTION

The present invention relates to a stripe-color filter used in a color TV camera for spatial color encoding.

As a color selective filter element of the stripe-color filter, a dichroic filter which utilizes the interference of light has been well known. It is constructed by laminating layers of a low refractive index material such as $MgF_2$ or $SiO_2$ alternately with layers of a high refractive index material such as $CeO_2$ or $TiO_2$. Since the laminated layers are made of inorganic materials, such a filter has a high heat-resistance. However, the formation of a multi-layer structure involves difficulties with regard to the control of the refractive index and the thickness of each layer, resulting in a wide scatter of spectral transmission characteristics.

Therefore, it has been desired to realize a filter of more simplified structure using an inorganic material. Thus, a semiconductor filter utilizing the fundamental absorption of a semiconductive substance has been proposed. The semiconductor filter has a simple structure composed of a semiconductor thin-film which need not be a laminated film of such a large number of layers as the dichroic filter. The thin-film, however, exhibits ripples in its spectral transmissivity, as shown in FIG. 1 which illustrates the spectral transmissivity of an exemplary semiconductor filter made of $Zn_xCd_{1-x}S$ ($0 \leq x \leq 1$). These ripples have a bad effect on the color separation.

SUMMARY OF THE INVENTION

It is an object of the invention to provide an improved stripe-color filter utilizing color selective filter strips of semiconductor material and having a desirable spectral transmissivity.

A stripe-color filter embodying the present invention comprises a striped semiconductor filter element layer interposed between a transparent substrate layer and a transparent dielectric covering layer. There are further provided a first coating layer of a transparent thin film between the substrate layer and the filter element layer and a second coating layer of a transparent thin film between the covering layer and the filter element layer. The refractive indexes of those layers are in the relationship: $n_s < n_{T1} < n_F$ and $n_D < n_{T2} < n_F$, wherein $n_s$ represents the refractive index of the transparent substrate layer, $n_{T1}$ the first coating layer, $n_F$ the semiconductor filter element, $n_D$ the transparent covering layer, and $n_{T2}$ the second coating layer. More preferably, $\sqrt{n_F n_s}$ is within $n_{T1} \pm 15\%$ and $\sqrt{n_F n_D}$ is within $n_{T2} \pm 15\%$. These conditions define the optimum anti-reflection condition.

The object of the invention may be achieved by providing a stripe-color filter as above, wherein the total thickness of the first and second coating layers is in such a range that the spectral characteristics of the total film comprising these layers exhibits a maximum transmissivity at a wavelength of from 400 to 700 nm.

The object of the invention may be further achieved by providing a stripe-color filter as above, wherein the total optical thickness of the first and second coating layer is smaller than $\frac{1}{4}$ of the wavelength at the fundamental absorption edge of the semiconductor filter element or is larger than 350 nm and smaller than $\frac{3}{4}$ of the wavelength at the fundamental absorption edge.

The object of the invention may be further achieved by providing a stripe-color filter as above, wherein the substrate layer and the covering layer have refractive indexes of from 1.4 to 1.8 and where the semiconductor filter element layer is composed of either $Zn_xCd_{1-x}S$, $Zn_xSe_{1-x}Te$ or $ZnS_xTe_{1-x}$, where x has a value between 0 and 1 and the first and second coating layers are composed of either $ZrO_2$, $Y_2O_3$, $In_2O_3$, $ThO_2$, $HfO_2$, $CeO_2$, $TiO_2$, $Ta_2O_5$, $ZnO$, $Eu_2O_3$ or $La_2O_3$.

The object of the invention may be still further achieved by providing a stripe-color filter as above, wherein the first coating layer has a thickness of from 0.05 to 0.07 micrometers or wherein the semiconductor filter element layer is composed of $Zn_xCd_{1-x}S$ in which x is between 0 and 1 and the first and second coating layers are composed of either $ZrO_2$, $Y_2O_3$ or $In_2O_3$.

DETAILED DESCRIPTION OF THE INVENTION

Figure 1:
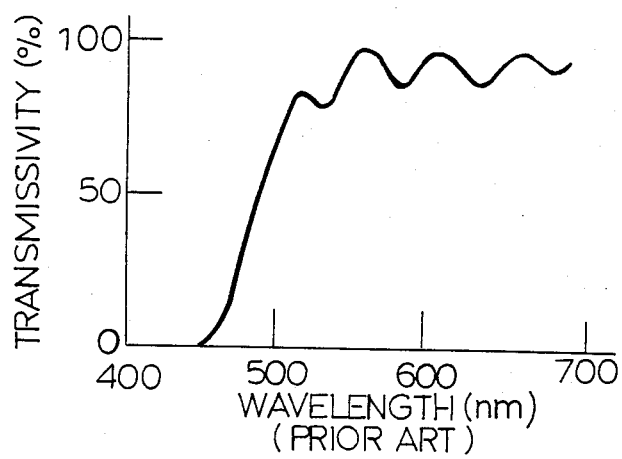
FIG. 1 is a graph showing a spectral transmissivity of a conventional semiconductor filter.
Figure 2:
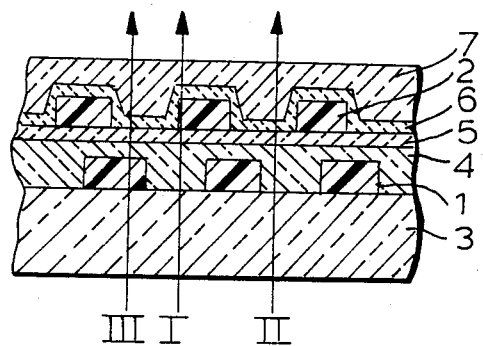
FIG. 2 is a sectional view of a stripe-color filter according to the invention.

FIG. 2 shows a stripe-color filter used for spatial color encoding. It includes two filter components. The first filter component has a set of cyan light transmissive strips 1 which are composed of a dichroic filter element. The second filter component has a set of yellow light transmissive strips 2 which are composed of a semiconductor filter element. These two filter components are laminated in the manner that said sets of strips 1 and 2 are in the predetermined angular relationship.

The cyan light transmissive strips 1 of a dichroic filter element are formed on a glass substrate 3. A glass layer 4 of the same quality as the glass substrate 3 is deposited so as to cover the cyan light transmissive strips 1 and the glass substrate 3 and so as to form a flat upper surface. This glass layer 4 may be an $Al_2O_3$ film of 0.15 to $0.4\mu$. The upper surface having a thickness of from the glass layer 4 is coated with a first coating layer 5 of a transparent thin film. On the first coating layer 5 are formed the yellow light transmissive strips 2 which are composed of a thin film of $Zn_xCd_{1-x}S$ ($0 \leq x \leq 1$), a semiconductor color filter material. A second coating layer 6 of transparent thin film is deposited so as to cover the yellow light transmissive strips 2 and a part of the first coating layer 5 where the yellow light transmissive strips 2 are not placed. The first and second coating layers 5 and 6 are composed of $ZrO_2$. The upper surface of those elements are covered with a covering layer 7 of a transparent dielectric material. The covering layer 7 may be a glass layer of the same quality as the glass substrate 3.

Figure 3:
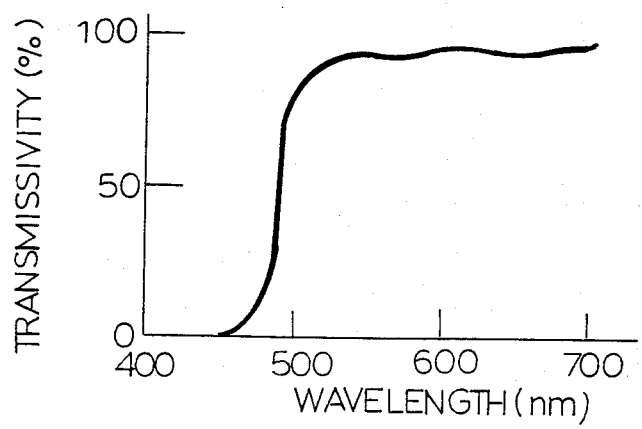
FIG. 3 is a graph showing a spectral transmissivity at a semiconductor filter region of the stripe-color filter of FIG. 2.

The strips 1 of a dichroic filter elements are constructed in a conventional manner. The feature of the invention exists in the construction of the second filter component, i.e., the semiconductor filter element strips 2 being interposed between the first and second coating layers 5 and 6. As an example, the refractive index $n_s$ of the glass layer 4 is 1.6, the refractive index $n_F$ of the semiconductor filter element strips 2 is 2.5, the refractive index $n_D$ of the covering layer 7 is 1.6 and the refractive indexes $n_{T1}$ and $n_{T2}$ of the first and second coating layers 5 and 6, respectively, are about 2.0. Therefore, $n_s < n_{T1} < n_F$, $n_D < n_{T2} < n_F$, $\sqrt{n_F \cdot n_s} \approx n_{T1}$ and $\sqrt{n_F \cdot n_D} \approx n_{T2}$, which meets the above-mentioned anti-reflection coating condition. Thus the first and second coating layers 5 and 6 act as anti-reflection coatings and so the transmissivity at the region of the semiconductor filter element strips 2, i.e., in the path indicated by an arrow I in FIG. 2, is increased to about 95% as shown in FIG. 3. This greatly improves (i.e.-reduces) the ripples of the spectral transmissivity.

Figure 4:
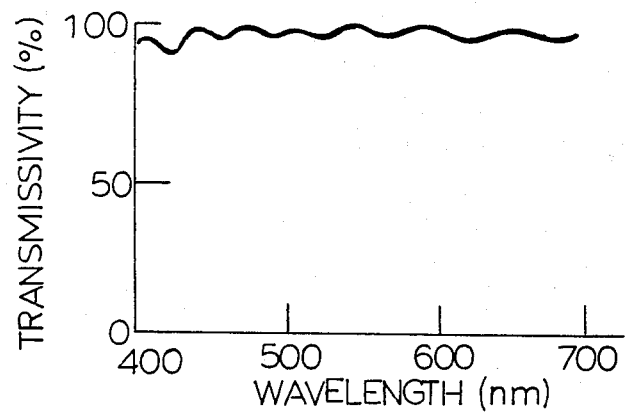
FIG. 4 is a graph showing a spectral transmissivity at a transparent region of the stripe-color filter of FIG. 2.
Figure 5:
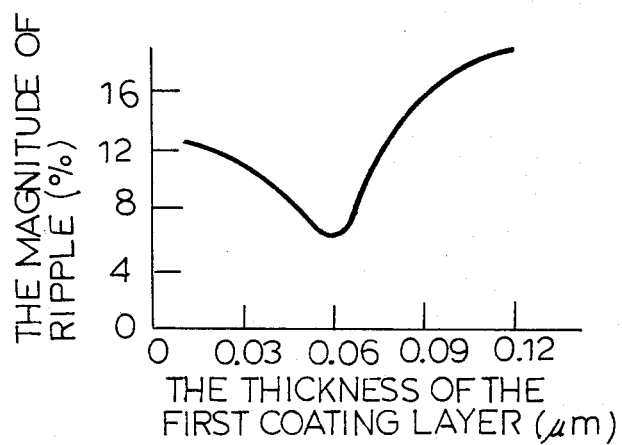
FIG. 5 is a graph showing the relationship between the thickness of a first transparent coating layer and the magnitude of a ripples in the spectral transmissivity at the semiconductor filter region of the stripe-color filter of FIG. 2.

On the other hand, in the transparent region where light does not pass through the semiconductor filter element strips 2 as in a path II in FIG. 2, the coating layers 5 and 6 cause the reflection which reaches 12% at maximum value, because of the difference between the refractive indexes of the coating layers 5 and 6 and the glass layer 4. It means a decrease of transmissivity. This disadvantage is reduced by adjusting the total thickness of the coating layers 5 and 6 so that the maximum transmissivity wavelength in spectral transmissivity through the coating layers 5 and 6 exists in the range from 400 nm to 700 nm, as shown in FIG. 4. Thus, it is possible to provide the coating layers 5 and 6 without giving substantial affect to the transparent area. In order to obtain such a spectral transmissivity, the total thickness of the coating layers 5 and 6 should be from 0.1 to 0.18 $\mu$m. The thickness of the first coating layer 5 greatly affects the reduction of the ripples in the spectral transmissivity in the region of the semiconductor filter element strips 2. As shown in FIG. 5, the magnitude of the ripples is satisfactorily low when the thickness of the first coating layer 5 is from 0.05 to 0.07 $\mu$m. Furthermore, the transmissivity showed a maximum value in such a range. On the other hand, the thickness of the second coating layer 6 does not affect the reduction of ripples to such a great extent. Therefore, it is desirable that the first coating layer 5 be made equal to from 0.05 to 0.07 $\mu$m thick and the second coating layer be formed of such a thickness that the total thickness of the two coating layers 5 and 6 becomes equal to from 0.1 to 0.18 $\mu$m.

Figure 6:
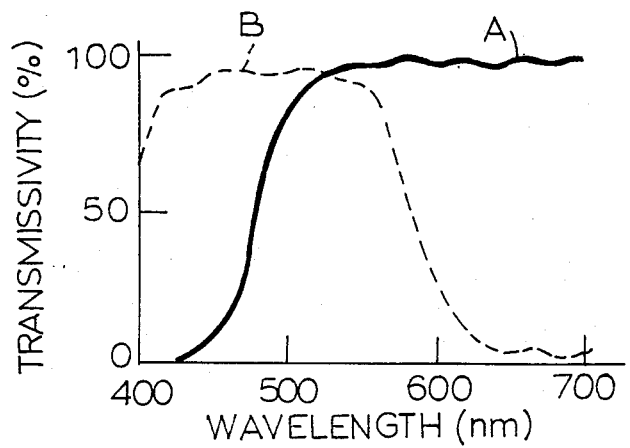
FIG. 6 is a graph showing the spectral transmissivities of the semiconductor filter region and a dichroic filter rigion of the stripe-color filter of FIG. 2.

Thus constructed stripe-color filter exhibits the spectral transmissivity as shown in FIG. 6. A curve A in FIG. 6 represents the transmissivity along I of FIG. 2 and a curve B along III of FIG. 2, wherein the transmissivity is determined by taking the amount of transmission of light along II of FIG. 2 as reference of 100%. It is seen from these curves that the coating filters do not affect the spectral characteristics of the dichroic filter element region.

As further material for the yellow light transmissive strips composed of a semiconductor, $Zn_xSe_{1-x}Te$, $ZnS_xTe_{1-x}$ or $Zn_xCd_{1-x}Se$, in which $0 \leq x \leq 1$, may be used. As further material for the anti-reflection coating layer, $Y_2O_3$, $In_2O_3$, $ThO_2$, $HfO_2$, $CeO_2$, $TiO_2$, $Ta_2O_5$, $La_2O_3$, $Eu_2O_3$ or $ZnO$ may be deposited. The refractive indexes of the glass layer and the covering layer 7 are preferably in the range of from 1.4 to 1.8 for practical convenience.

Figure 7:
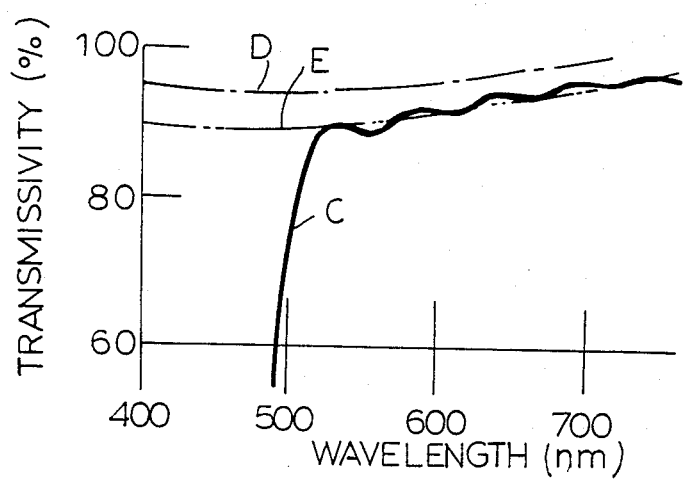
FIG. 7 is a graph explaining the more detailed characteristics of spectral transmissivity of the semiconductor filter element.

Generally speaking, the refractive index of a semiconductor becomes smaller from that of the edge of fundamental absorption as the wavelength becomes longer, so that the reflectivity tends to become smaller from around the wavelength of the edge of fundamental absorption to the longer wavelength side. This tendency is enhanced when the semiconductor film has large thickness. For example, $Zn_xCd_{1-x}S$ ($0 \leq x \leq 1$) of more than 1 $\mu$m thick exhibits the spectral transmissivity as shown in FIG. 7, curve C. Therefore, it is preferable that the transparent region of the stripe-color filter, i.e., the region located along the path II, has the similar tendency of spectral transmissivity for the sake of good color separating characteristics.

It can be achieved by adjusting the thickness of the anti-reflection coating layers. The total optical thickness of the first and second coating layers is adjusted so as to be smaller than one-quarter of the wavelength at the fundamental-absorption edge of the semiconductor filter element, or so as to be larger than $\frac{1}{2} \times 700$ nm and smaller than three-quarter of the wavelength at the fundamental-absorption edge. The former condition means that a $\frac{1}{4}\lambda_o$ reflection peak exists in the shorter wavelength region than that at the fundamental-absorption edge. The latter condition means that a $\frac{1}{2}\lambda_o$ transmission peak exists in the longer wavelength region than 700 nm and a $\frac{3}{4}\lambda_o$ reflection peak exists in the shorter wavelength region than that at the fundamental-absorption edge. Thus, by utilizing the slant of reflection characteristic curve of a thin film, it is possible to match the transmissivity characteristic of the transparent region with that of the semiconductor filter element region. Curves D and E in FIG. 7 represent examples of the spectral transmissivity of thus prepared anti-reflection coating layers.

Figure 8:
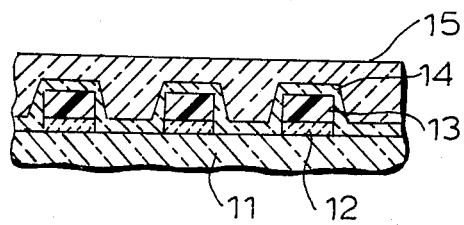
FIG. 8 is a sectional view of a stripe-color filter of another embodiment of the invention.

An example in which the anti-reflection coating layers have an optical thickness which is smaller than one-quarter of the wavelength at the fundamental-absorption edge is illustrated in FIG. 8. In this figure, there is shown only the portion of one filter component which has the semiconductor filter element and the other portion is omitted. On a glass substrate 11 with a refractive index of 1.6 is deposited a first coating layer 12 of $In_2O_3$ which has a refractive index of 2.0, and semiconductor filter element strips 13 of $Zn_xCd_{1-x}S$ ($0 \leq x \leq 1$) are formed on the first coating layer 12. The first coating layer 12 has a thickness of from 0.05 to 0.07 $\mu$m and is cut into the strips of the same shape as the filter strips 13. A second coating layer 14 covers the filter strip 13 and the spaces between the filter strips 13. The second coating layer 14 is made of $Y_2O_3$ which has a refractive index of 1.9 and has a thickness of from 0.05 to 0.06 $\mu$m. A glass layer 15 with a refractive index of 1.6 is formed, covering the second coating layer 14.

The second coating layer 14 is one-quarter wavelength thick at a wavelength of from 400 to 480 nm and exhibits a maximum reflectivity of 7 to 8% and a mean reflectivity about 4%. The spectral transmissivity thereof is represented by the curve D of FIG. 7 which raises gradually to the long wavelength side.

The formation of the first coating layer 12 into the stripes is effected for making sufficiently small the total thickness of the coating layers 12 and 14 at the transparent region, thereby maintaining a sufficient thickness for each coating layer at the filter strip region. Therefore, it is not necessary to completely remove the first coating layer 12.

As an embodiment in which the anti-reflection coating layers make the total optical thickness larger than $\frac{1}{2} \times 700$ nm and smaller than three-quarters of the wavelength at the fundamental absorption edge, the same construction as the example of FIG. 2 can be used. For example, the semiconductor filter element is made of $Zn_xCd_{1-x}S$ ($0 \leq x \leq 1$) and the first and second coating layers are made of $Y_2O_3$. The first coating layer has the thickness of from 0.05 to 0.07 μm, and by adding the thickness of the second coating layer to that thickness, the above-mentioned requirement is satisfied. The glass substrate has a refractive index of 1.6. As the dielectric covering layer, an adhesive material with a refractive index of 1.55 is used for the purpose of a adhering the filter to a target of camera tube or a solid state imaging device. A thus constructed stripe-color filter exhibits a desirable spectral transmissivity of in the transparent region as shown by the curve E in FIG. 7.

Although the invention has been described in the form in which two striped layers of light-selective filter elements are superimposed with each other in a crossing relationship, a filter component having a semiconductor filter-element-layer according to the invention may be applied to any other arrangement of a striped-color filter. For example, it may be a component of a striped-color filter in which striped filter-element-layers are superimposed with each other in a parallel relationship, or a striped-color filter which includes only one filter-element-layer.

What is claimed is:

1. A stripe-color filter having a striped semiconductor filter-element-layer supported between a transparent substrate layer and a transparent dielectric covering layer, further comprising:

a first coating layer of a transparent thin film interposed between said transparent substrate layer and said semiconductor filter-element-layer; and a second coating layer of a transparent thin film interposed between said semiconductor filter element layer and said transparent covering layer;

the refractive indexes of those layers being in the relationship: $n_F > n_{T1} > n_S$ and $n_F > n_{T2} > n_D$, wherein $n_S$ represents the refractive index of substrate layer, $n_{T1}$ the refractive index of said first coating layer, $n_F$ the refractive index of said semiconductor filter element, $n_D$ the refractive index of said covering layer, and $n_{T2}$ the refractive index of said second coating layer.

2. A stripe-color filter as claimed in claim 1, wherein the total thickness of said first and second coating layers is in such a range that the spectral characteristic of the total film comprising these layers exhibits a maximum transmissivity at a wavelength of from 400 to 700 nm.

3. A stripe-color filter as claimed in claim 1, wherein the total optical thickness of said first and second coating layers is smaller than one-quarter of the wavelength at the fundamental-absorption edge of the semiconductor filter element, or is larger than $\frac{1}{2} \times 700$ nm and smaller than three-quarters of the wavelength at the fundamental-absorption edge.

4. A stripe-color filter as claimed in claim 1, wherein said substrate layer and said covering layer have refractive indexes of from 1.4 to 1.8, said semiconductor filter-element-layer is composed of either $Zn_xCd_{1-x}S$, $Zn_xSe_{1-x}Te$ or $ZnS_xTe_{1-x}$, in which $0 \leq x \leq 1$, and said first and second coating layers are composed of either $ZrO_2$, $Y_2O_3$, $In_2O_3$, $ThO_2$, $HfO_2$, $CeO_2$, $TiO_2$, $Ta_2O_5$, $ZnO$, $Eu_2O_3$ or $La_2O_3$.

5. A stripe-color filter as claimed in claims 1, 2, or 3, wherein said first coating layer has a thickness of from 0.05 to 0.07 μm.

6. A stripe-color filter as claimed in claims 1, 2, or 3, wherein said first coating layer has a thickness of from 0.05 to 0.07 μm and wherein said semiconductor filter element layer is composed of $Zn_xCd_{1-x}S$ in which $0 \leq x \leq 1$ and said first and second coating layers are composed of either $ZrO_2$, $Y_2O_3$ or $In_2O_3$.

* * * * *